US008843112B2

(12) United States Patent
Hossain et al.

(10) Patent No.: US 8,843,112 B2
(45) Date of Patent: Sep. 23, 2014

(54) METHOD AND SYSTEM FOR DATA SESSION ESTABLISHMENT

(75) Inventors: Asif Hossain, San Jose, CA (US); David P. Ma, Ottawa (CA); Kwong Hang Kevin Chan, Markham (CA); Lan Lu, Kanata (CA)

(73) Assignee: BlackBerry Limited, Waterloo (CA)

( * ) Notice: Subject to any disclaimer, the term of this patent is extended or adjusted under 35 U.S.C. 154(b) by 468 days.

(21) Appl. No.: 12/829,530

(22) Filed: Jul. 2, 2010

(65) Prior Publication Data

US 2012/0003958 A1    Jan. 5, 2012

(51) Int. Cl.
*H04M 1/66*    (2006.01)
*H04W 48/18*    (2009.01)
*H04L 29/06*    (2006.01)
*H04W 12/08*    (2009.01)
*H04W 8/26*    (2009.01)
*H04W 76/02*    (2009.01)
*H04W 48/00*    (2009.01)
*H04W 88/06*    (2009.01)
*H04W 12/06*    (2009.01)

(52) U.S. Cl.
CPC ............... *H04W 48/18* (2013.01); *H04W 8/26* (2013.01); *H04W 76/02* (2013.01); *H04W 48/00* (2013.01); *H04L 63/101* (2013.01); *H04L 63/0892* (2013.01); *H04W 12/08* (2013.01); *H04W 88/06* (2013.01); *H04W 12/06* (2013.01)
USPC .................... 455/411; 455/435.2; 455/435.3; 455/432.1; 455/443

(58) Field of Classification Search
CPC .. H04L 63/101; H04L 63/0892; H04W 12/06
USPC .................. 455/411, 432.1, 435.2, 435.3, 443
See application file for complete search history.

(56) References Cited

U.S. PATENT DOCUMENTS

| | | | |
|---|---|---|---|
| 6,999,762 B2 | 2/2006 | Uchida | |
| 2006/0104211 A1* | 5/2006 | Islam et al. | 370/252 |
| 2006/0167871 A1* | 7/2006 | Sorenson et al. | 707/6 |
| 2007/0058578 A1* | 3/2007 | Hossain et al. | 370/328 |
| 2009/0082019 A1* | 3/2009 | Marsico | 455/435.2 |
| 2009/0253432 A1* | 10/2009 | Willey et al. | 455/435.2 |
| 2010/0015973 A1* | 1/2010 | Islam et al. | 455/434 |
| 2010/0136967 A1* | 6/2010 | Du et al. | 455/432.3 |

FOREIGN PATENT DOCUMENTS

| | | |
|---|---|---|
| EP | 1527653 | 10/2007 |
| WO | 2007020515 A1 | 2/2007 |
| WO | 2009102368 A1 | 8/2009 |

OTHER PUBLICATIONS

3GPP2 A.S0008-C v1.0, Jul. 2007, "Interoperability Specification (IOS) for High Rate Packet Data (HRPD) Radio Access Network Interfaces with Session Control in the Access Network", Section 2.4 (A12 Interface).

(Continued)

*Primary Examiner* — Qun Shen
(74) *Attorney, Agent, or Firm* — Moffat & Co.

(57) ABSTRACT

A method and system for data session establishment from a mobile device in a multiple networks scenario, the method including, checking whether an identifier for an first network is on a blacklist on the mobile device; if the first network identifier is not on the blacklist, attempting to establish a data connection with the first network; and if the first network identifier is on the blacklist, establishing a data connection with a second network. The method and system for data session establishment include deriving and maintaining the blacklist.

21 Claims, 7 Drawing Sheets

(56) References Cited

OTHER PUBLICATIONS

EP Application 10168225.0, European Search Report dated Aug. 31, 2010.
3GPP2 C.S0087-0 v1.0, May 15, 2009, "E-UTRAN—cdma2000 Connectivity and Interworking: Air Interface Specification Revision 0".
3GPP2 C.S0016-D v1.0, Jan. 25, 2010, "Over-the-Air Service Provisioning of Mobile Stations in Spread Spectrum Standards Release D".

* cited by examiner

| Identifier | Timestamp |
|---|---|
| 1234 | ###### |
| 2345 | ###### |

410 — Identifier
420 — Timestamp

FIG. 4

METHOD AND SYSTEM FOR DATA SESSION ESTABLISHMENT

FIELD OF THE DISCLOSURE

The present disclosure relates to mobile devices and in particular to the establishment of data sessions from the mobile devices.

BACKGROUND

A Code Division Multiple Access (CDMA) 1×/EVDO hybrid access terminal (mobile device) is a device which operates in a hybrid fashion that supports both CDMA 1× and EVDO radio access technologies (RATs). EVDO stands for Evolution Data Only or Data Optimized and, as suggested by this, is a data only system. EVDO is alternatively known as High Rate Packet Data (HRPD). One advantage of an EVDO system is that it allows a higher transfer rate for data. EVDO networks are also useful to carriers to free CDMA 1× system voice capacity by removing data traffic from the CDMA 1× system.

A mobile device operating in a CDMA 1×/EVDO hybrid mode will first acquire either an EVDO network or a CDMA 1× network, and once this network has been acquired and it is in an idle state the mobile device will then try to acquire an associated 1× network or an associated EVDO network respectively.

In order to acquire the EVDO system, an access network (AN) authentication must occur through an A12 interface. A12 is the interface that carries signaling information related to access authentication between the Session Controls/Mobility Management (SC/MM) functions in the AN and the AN-AAA (Access Network-Authentication, Authorization and Accounting Entity). AN authentication uses a Challenge-Handshake Authentication Protocol (CHAP) to authenticate a mobile device. AN authentication occurs upon the mobile device first attempting to access the access network and establish an initial EVDO session and is repeated after a session timeout or the access network fails to reach the mobile device after a keep alive timer expires. A12 interfaces are described in the Third Generation Partnership Project 2 (3GPP2) A.S0008 specification, the contents of which are incorporated herein by reference.

If AN authentication fails, the mobile device will periodically attempt to connect with the EVDO network to establish an EVDO session. The repetition of connection attempts wastes network resources and battery life on the device since the authentication failure likely signals future authentication failures. In addition, the repeated attempts to authenticate AN may delay data session setup on a CDMA 1× network, potentially resulting in a poor user experience.

Similarly, for devices that support a hybrid mode of other RATs operating under multiple networks, authentication on a first network may fail. Repetition of connection attempts to that network waste resources. For example, a connection to a Long Term Evolution (LTE) network may be attempted, and may fail. Further connection attempts to the LTE network may waste resources and may delay data session setup on networks of different RATs found over the air.

BRIEF DESCRIPTION

The present disclosure will be better understood with reference to the drawings in which:

FIG. 4 is an exemplary blacklist table;

DETAILED DESCRIPTION

The present disclosure provides a method for data session establishment from a mobile device comprising checking whether an identifier for a first network is on a blacklist on the mobile device; if the first network identifier is not on the blacklist, attempting to establish a data connection with the first network; and if the first network identifier is on the blacklist, establishing a data connection with a second network.

The present disclosure further provides a mobile device configured for data session establishment with a network comprising: a communications subsystem; and a processor, wherein the mobile device is configured to: check whether an identifier for an first network is on a blacklist on the mobile device; if the first network identifier is not on the blacklist, attempt to establish a data The present disclosure is described below with regard to a CDMA 1× and EVDO. This is however not meant to be limiting and the methods and systems described herein could be equally applied to other radio access technologies (RATs). Such other radio access technologies include, but are not limited to, Evolved Universal Mobile Telecommunications System Terrestrial Radio Access Network (EUTRAN, also referred as Long Term Evolution or LTE), UMTS Terrestrial Radio Access Network (UTRAN), GSM EDGE Radio Access Network (GERAN), among others. The use of CDMA 1× and EVDO below is therefore only for illustrative purposes.

Figure 1:
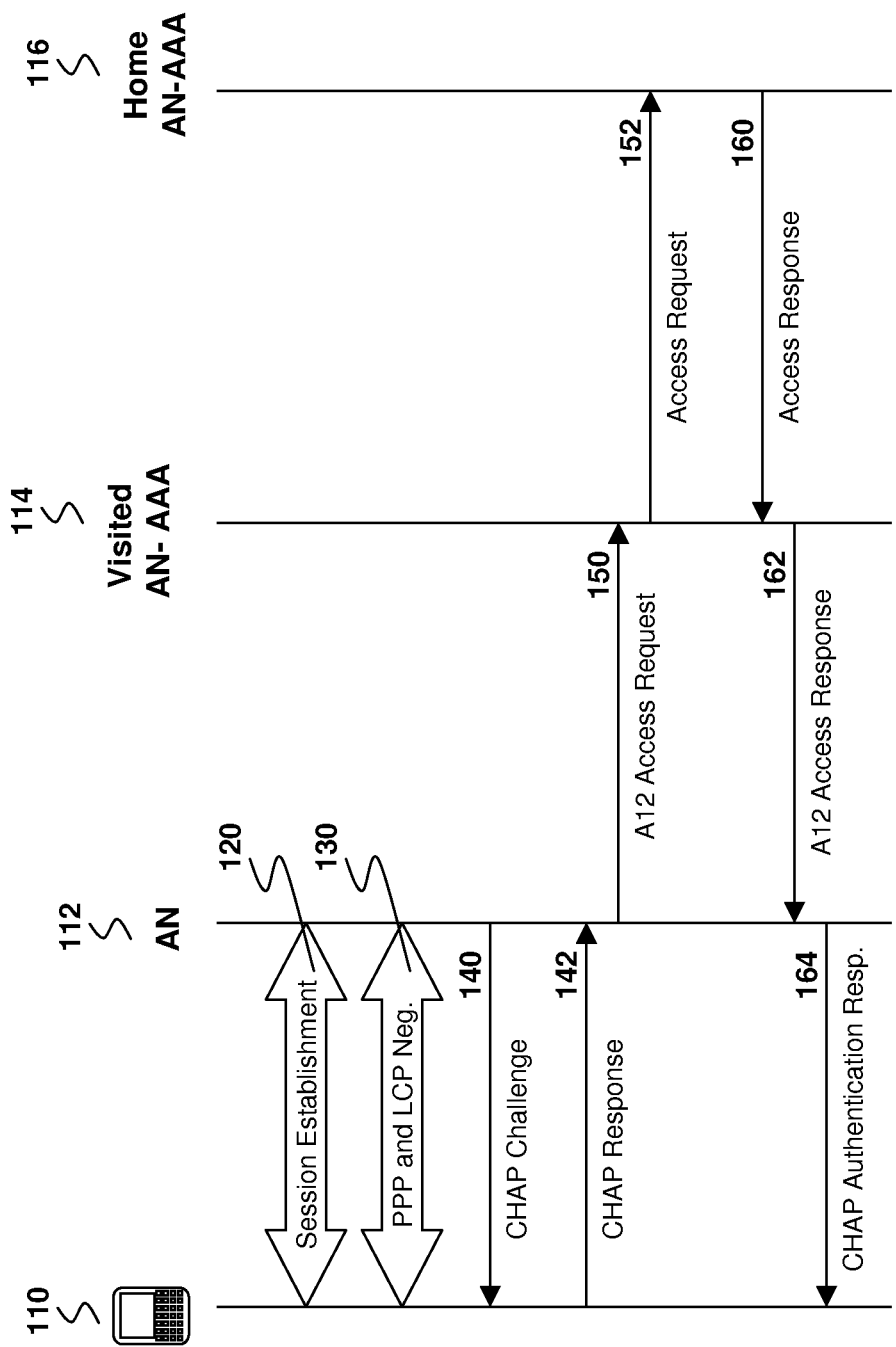
FIG. 1 is a data flow diagram showing EVDO access network authentication of a mobile device.

Reference is now made to FIG. 1. FIG. 1 shows EVDO access network authentication. In FIG. 1, a mobile device 110 communicates with an Access Network (AN) 112, which in turn communicates with a Visited Access Network AAA 114. Visited Access Network AAA 114 communicates with a Home Access Network AAA 116.

A mobile device 110 communicates with Access Network 112 for session establishment, as seen by arrow 120. A point-to-point protocol (PPP) and link control protocol (LCP) negotiation then occur between the mobile device 110 and the AN 112, as seen by arrow 130.

After the PPP and LCP negotiations, AN 112 sends a CHAP challenge 140 to mobile device 110. In response, mobile device 110 sends CHAP response 142 back to AN 112. The response 142 is based on the A12 CHAP identifier and includes the A12 network access identifier (NAI) and the CHAP access authentication password.

AN 112 then sends visited access network AAA 114 an A12 access request 150. A12 access request 150 includes the challenge and response.

Visited access network AAA 114 then uses a network access identifier to forward message 152 to the proper home AN-AAA server 116.

Home AN-AAA 116 validates the CHAP response and responds with an authorization response as shown by message 160. The visited access network AAA 114 forwards the response to AN 112, as shown by message 162.

The AN 112 then informs the mobile device 110 of the A12 authentication results, as seen by message 164. As defined in 3GPP2 A.S0008 the result may be A12 access-accept or A12 access-reject.

The access network authentication may result in rejection if, for example, the mobile device is not provisioned by the network to allow EVDO access. For example, a mobile device may be in a roaming network with no home network agreement. Other reasons for authentication failure will be known to those in the art.

Always on mobile devices generally desire the establishment of a data session at the earliest opportunity. The EVDO access network authentication typically coincides with EVDO session set up, and precedes data session setup. Repeated failed attempts at authenticating AN in this scenario delays data session setup, potentially resulting in a poor user experience. For example, the delay in the data session setup may be perceived as a stall in acquiring data services at the mobile device. Further, the repeated attempts to authenticate AN may result in possible battery life impacts since vendors may deploy some sort of EVDO session recovery, which if network provision and conditions do not change, will always fail when attempting AN authentication. In addition, over the air resources may be wasted. Device should therefore find an alternate way to establish a data session and avoid unnecessary repeated attempts to authenticate AN.

When authentication fails with a network associated with a particular RAT, it may in some scenarios be advantageous to attempt a data connection on a network of a different RAT instead of a network of the same RAT. In an EVDO+EUTRAN (LTE)+UTRAN (UMTS)+GERAN (GSM)+CDMA 1× coverage for example, if the terminal fails to authenticate with the EVDO network, it may fall back to an attempt to attach with the EUTRAN or UTRAN or GERAN network or authenticate with the CDMA 1× network. As will be appreciated, additional EVDO networks discovered over the air may share the same authentication entity as the EVDO network initially discovered. The probability of failing authentication is higher when re-trying authentication with EVDO networks that may share the same authentication entity than attempting a data connection on a network with an alternative radio access technology (RAT) which has a different authentication entity. Moreover, the retry interval mandated by a particular RAT may further delay data session setup.

Thus, if failing data authentication on a network of one RAT, a further attempt can be made on a second network of a different RAT that may be associated with the original network, but has a different authentication entity. The first network and the second network may belong to the same wireless carrier, or they belong to different wireless carriers that they may have roaming agreements between each other. As a result, the two networks of different RATs may have some form of association between each other. For EVDO and CDMA 1× the association is through the Preferred Roaming List or Extended Preferred Roaming List as described in 3GPP2 C.S0016, or through the use of broadcast message "Alternative Technologies Information Message" as described in 3GPP2 C.S0005-E. EVDO is authenticated by AN-AAA while CDMA 1× data is authenticated by an AAA server, as described above. For EUTRAN and EVDO, the association is through broadcast messages such as SystemInformationBlockType8 of 3GPP TS 36.331 and E-UTRAN Neighbor List Record of 3GPP2 C.S0087, the contents of which are incorporated herein by reference. EUTRAN and EVDO are authenticated by home subscriber server (HSS) and AN-AAA respectively. For EUTRAN/UTRAN/GERAN, these may have different authentication entities but be associated by public land mobile network (PLMN). In addition, networks of different RATs may also be associated through the use of a provisioning message "multi-mode system selection (MMSS) system Priority List (MSPL)", as described in 3GPP2 C.S0016-D. Other ways of associating networks of different RATs will be known to those in the art.

The association between the first network and the second network may, in some cases, be that the first and second networks utilize different authentication entities, thus providing a higher probability of successful data connection on the second network if authentication fails on the first network. In other embodiments, the first network and the second network may be related by data speed. Thus the first network may be a higher speed data network and the second network may have a lower speed data connection. For example, the device may try to connect with an EUTRAN network first and then fall back to an UTRAN or GERAN network, or may attempt to connect with an EVDO network first and fall back to a CDMA 1× network to connect data.

Further, in one embodiment a first network with a higher data rate may be an overlay of the second network, the second network having a lower data rate and larger footprint than the first network. For example, the device may try to connect with an EUTRAN network first which has a smaller footprint and then fall back to an EVDO network which has a larger footprint due to the fact that it was introduced for a longer time.

The networks may utilize messages to define relationships between themselves. Such messages may include, for example, the broadcast or provisioning messages described above. In other cases, networks may utilize associations such as the PLMN. In further cases, networks may utilize Preferred Roaming List or Extended Preferred Roaming List for associations.

As will be appreciated by those in the art, a list may be maintained of the loss indication failures encountered. A general case is described with regards to FIG. 2.

Figure 2:
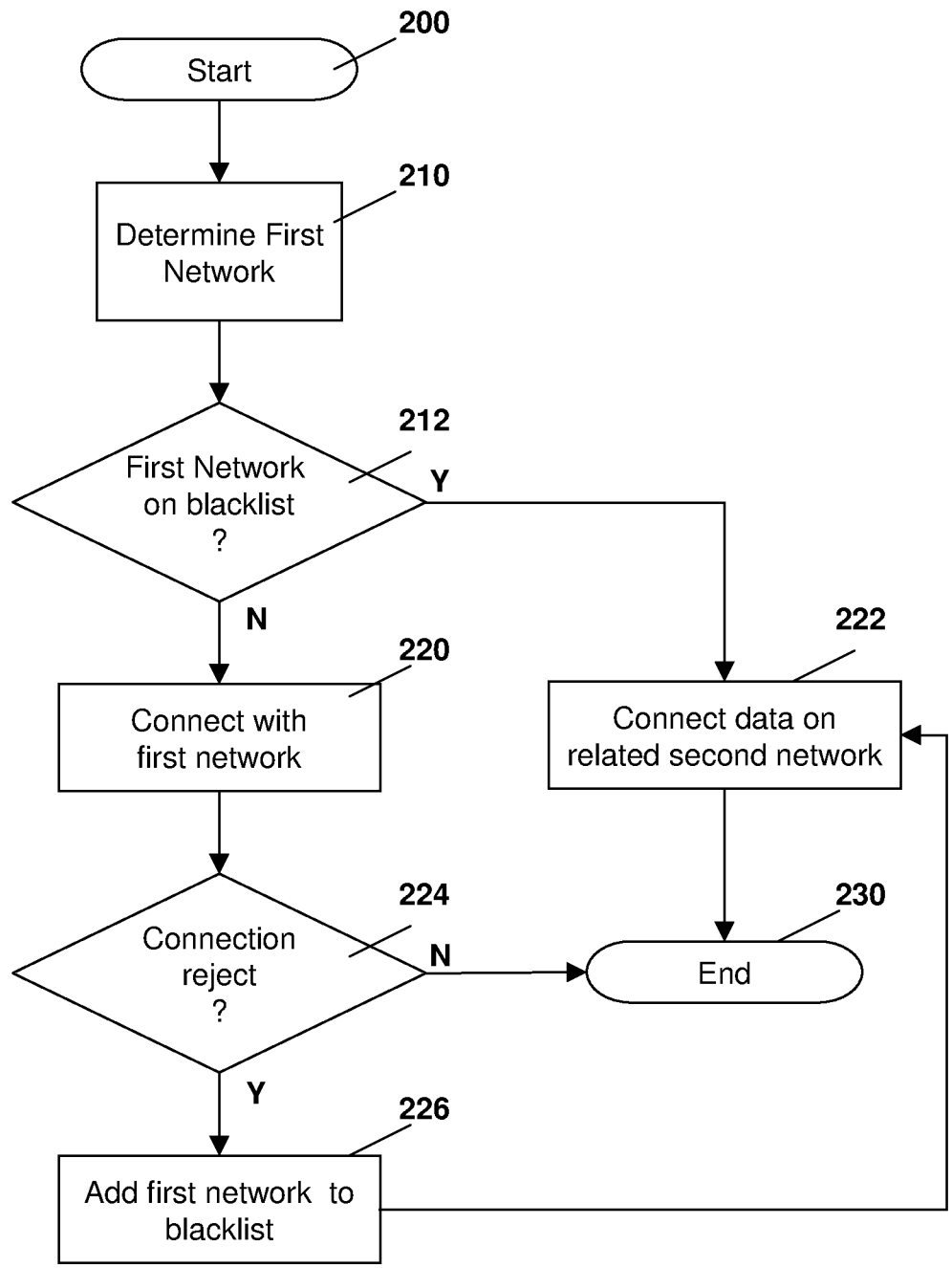
FIG. 2 is a flow diagram showing a process for network connection in a multiple networks scenario.

Specifically, reference is now made to FIG. 2, which shows a process diagram for network connection in a multiple networks scenario.

Specifically, the process of FIG. 2 starts at block 200 and proceeds to block 210 in which the first network to connect to and authenticate with is determined. The determination of block 210 may be predefined. For example, a mobile device may wish to connect to an EUTRAN network first. Alternatively, the mobile device may prefer to connect to an EVDO network, for example.

The first network of block 210 may be any of the networks described above, such as EUTRAN, UTRAN, GERAN, EVDO, and CDMA 1×, among others. The first network may also be any other network the mobile device wishes to connect to.

From block 210, the process proceeds to block 212 in which a determination is made of whether the first network is on a blacklist. If yes, the process proceeds to block 222 in which a data connection is established with a second network. As will be appreciated by those in the art, the second network may be any network related to the first network, and examples include an EVDO or UTRAN or GERAN or CDMA 1× as the second network when the first network is EUTRAN, CDMA 1× for the second network when the first network is EVDO, among other examples.

The connection in block 222 may also include checks to ensure the second network is not on a blacklist (not shown).

From block 222 the process proceeds to block 230 and ends.

If, in block 212, it is determined that the first network is not on a blacklist, the process proceeds to block 220 in which a connection attempt is made to the first network. The process then proceeds to block 224 in which a check is made to determine whether the connection was authenticated.

From block 224, if the connection was not rejected the process proceeds to block 230 and ends. If the connection was rejected, the process proceeds from block 224 to block 226 in which the first network is placed on the blacklist. The process then proceeds to block 222 to connect on the second network as described above.

Figure 3:
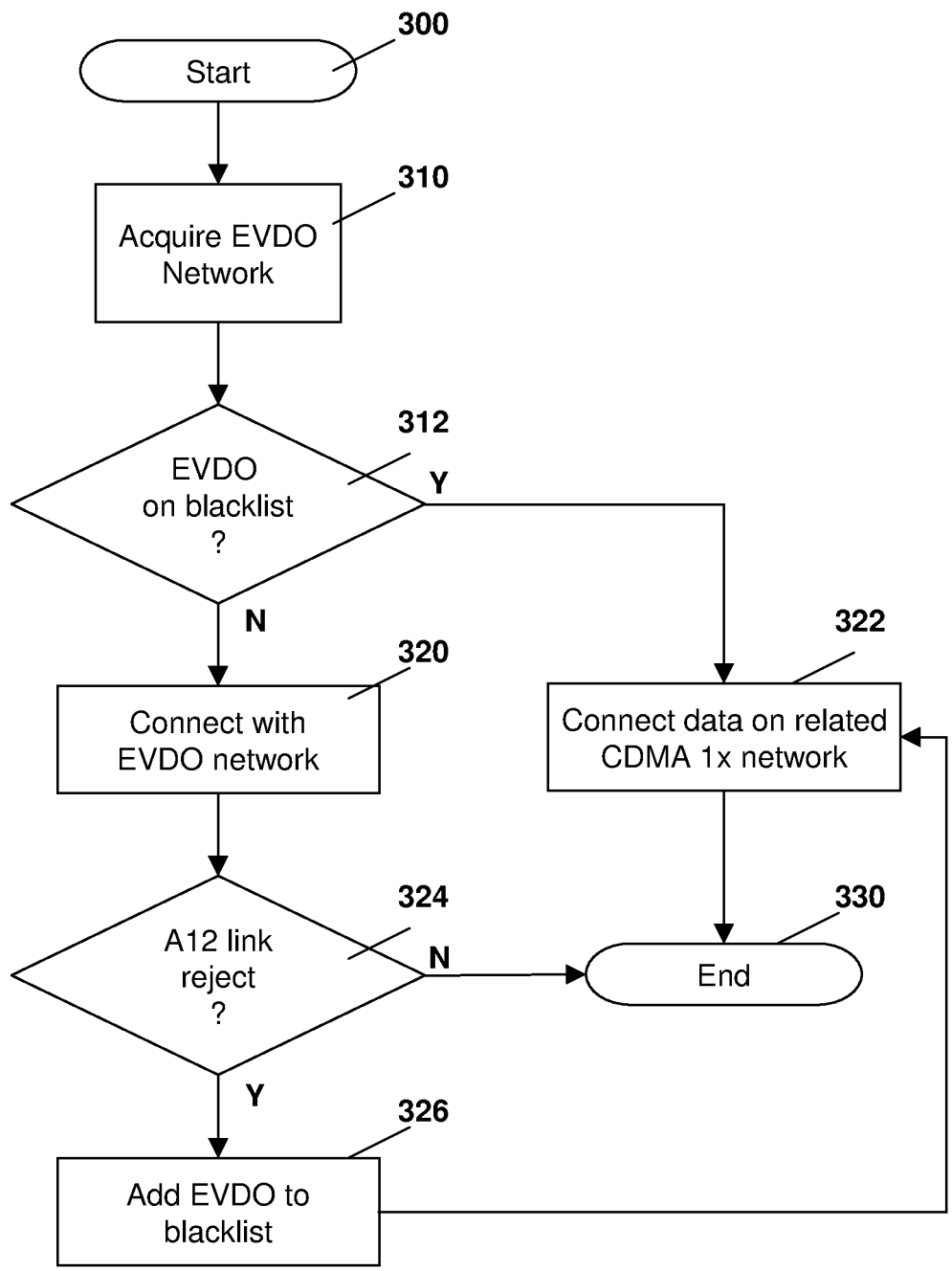
FIG. 3 is a flow diagram showing a process for data session establishment over a hybrid coverage of EVDO and CDMA 1×.

The process of FIG. 2 may be illustrated with regard to a hybrid EVDO/CDMA 1× coverage. Reference is now made to FIG. 3.

The process of FIG. 3 starts at block 300 and proceeds to block 310 in which the mobile determines which EVDO network to acquire and authenticate.

The process then proceeds to 312 in which a check is made to determine whether the EVDO network acquired is on a blacklist. The blacklist is explained in more detail below.

If, in block 312, it is determined that the EVDO network is on a blacklist, the process proceeds to block 322 in which the mobile decides to authenticate a data session on a related CDMA 1× network. The process then proceeds to block 330 and ends. As will be appreciated by those in the art, if the EVDO network is on the blacklist, AN authentication with the EVDO network is likely to fail and thus an attempt to connect with the EVDO network is avoided and data is established over the related CDMA 1× network instead.

Conversely, if in block 312 the EVDO network is not on a blacklist, the process proceeds to block 320 in which the mobile attempts to setup an EVDO session and authenticate AN with the EVDO network.

From block 320 the process proceeds to block 324 in which a check is made to determine whether the AN authentication was accepted or rejected. If the AN authentication was rejected the process proceeds to block 326 in which the EVDO network is added to the blacklist and the process then proceeds to block 322 to connect to the related CDMA 1× network for the data session, as described above.

If, in block 324 it is determined that A12 authentication was successful the process proceeds to 330 and ends.

Based on FIG. 3 above, identifiers for EVDO networks are maintained on a blacklist for a time in order to avoid multiple attempts at establishing an EVDO session after an AN authentication rejection.

In a further embodiment, the addition of an EVDO network to the blacklist in block 326 may also involve the addition of associated EVDO networks to the blacklist. In particular, an EVDO network on a particular channel (e.g. channel x) can broadcast the existence of other EVDO networks (e.g. EVDO networks on channel y and z) through a SectorParameters message as described in 3GPP2 C.S0024. This can, for example use the ChannelCount/Channel field and NeighborChannelIncluded/NeighborChannel field in the SectorParameters message. The information can thus be broadcast on a broadcast channel of the EVDO network.

In most of cases, EVDO networks on channel y and z from the example above will typically belong to the same carrier as EVDO network on channel x. The other EVDO networks will thus likely have similar authentication requirements.

If the device has attempted AN authentication on EVDO network on channel x and failed, in one embodiment the mobile device can proactively avoid scanning to and attempting AN authentication on EVDO networks on channel y and z because there is a high probability that AN authentication will also fail. This can be done through the addition of identifiers of EVDO network on channel x, but also identifiers of EVDO networks on channel y and channel z, to the blacklist in block 326. The addition of identifiers of EVDO networks on channel y and channel z at the same time identifiers of EVDO network on channel x is added will prevent the system from attempting to connect to these EVDO networks in blocks 310 and 320, thereby saving battery and network resources and potentially leading to a faster establishment of a data session on the CDMA 1× network.

As will be appreciated, the use of three channels above is only meant for illustrative purposes, and the system could have any number of EVDO networks.

The addition of identifiers of associated networks of the same RAT to the blacklist could also be applied to any of the RATs described above. Identifiers of associated networks of the same RAT could be derived from information broadcasted on a broadcast channel. Other ways of adding associated networks of the same RAT to the blacklist would be known to those in the art.

Reference is now made to FIG. 4. FIG. 4 shows an exemplary blacklist that may be maintained by a mobile device. In particular, a blacklist of FIG. 4 shows two fields, namely the identifier field 410 and a timestamp field 420.

The identifier field 410 identifies the network on the blacklist. Various ways to identify the network would be known to those in the art. For example, the identifier may be a subnet identifier for an EVDO network or may be a Location Area Identifier, Absolute Radio Frequency Channel Number (ARFCN), frequency band, Base Station Identity Code (BSIC), Public Land Mobile Network Identifier (PLMN ID), UTRA Absolute Radio Frequency Channel Number (UARFCN), Evolved Absolute Radio Frequency Channel Number (EARFCN), system identifier (SID), network identifier (NID), packet zone identifier (PZID) for other networks. Alternatively, an EVDO ColorCode may be utilized. The EVDO bandclass and channel number, in addition to EVDO subnet identifier or EVDO ColorCode, can also be used in adding associated EVDO networks to the blacklist. As will be appreciated, in order to shrink the subnet identifier to a smaller value, ColorCodes may be assigned to EVDO networks such that the EVDO networks with the same ColorCode are geographically spaced apart to avoid conflicts.

Other identifiers that would identify the network may also be used in identifier field 410.

In the example of FIG. 4, a timestamp field 420 may also be utilized with the identifier. In one embodiment, it is desirable that the blacklisting of a network be temporary. In other words, the blacklisted ColorCode or identifier is not permanently placed on an avoidance list (blacklist). Temporary blacklisting provides for the possibility that error conditions may change in the future to allow access for the mobile device.

An example of such changes may be that roaming provisioning is granted to the visiting mobile device at a later date. In this case, a suitable timeout may be applied to automatically remove the ColorCode or identifier from the blacklist. In this regard, timestamp 420 may be utilized to identify when the network was placed in the blacklist of FIG. 4 (or alternatively the time the ColorCode or identifier should be removed). This would allow the mobile to check for a time duration that the identifier of a network has been in the blacklist and to delete it when the predetermined threshold for the time has been exceeded.

For example, in FIG. 4, network identifier 1234 may have a first timestamp and network identifier 2345 may have a second timestamp. If network identifier 1234 was placed into the blacklist first then the timestamp for the network will show this and the expiration of the predetermined time may be determined based on this timestamp. At the predetermined time, identifier 1234 is removed from the blacklist while network identifier 2345 is maintained in the blacklist until expiration of that identifier.

As will appreciated by those in art, in alternative embodiments the blacklist may include only identifier field 410. In these embodiments, an alternative process to a timestamp may be utilized. For example, a timer may be started for each ColorCode or identifier or an interrupt may be set to cause the removal of the ColorCode or identifier. Other options would be known to those in the art.

In other embodiments, the list may also be cleared when the mobile device turns its radio off. For example, the list may be cleared when the mobile device goes into an airplane mode, is powered off, or the radio is turned off manually, among other scenarios. In this case the list may be cleared and when the radio is restored an attempt to establish a data session over the blacklisted network may be made.

As will be appreciated, a user that expects provisioning changes to be made may implement those provisioning changes on the mobile device immediately by turning off and on the radio, rather than being required to wait for a timeout. Thus, if a user is expecting to be allowed to use a data session while roaming then the user could turn off the radio of the mobile device and then turn the radio back on. The resulting clearing of the blacklist of FIG. 4 will allow the data session to be established over the blacklisted network that has now been provisioned.

Figure 5:
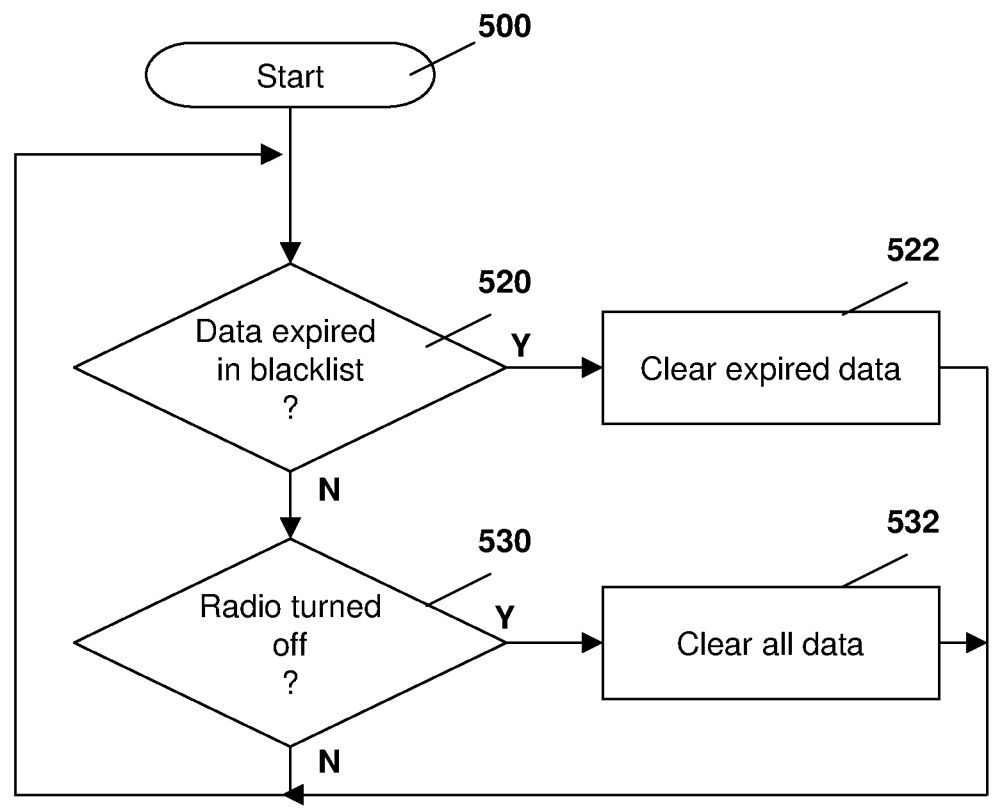
FIG. 5 is a flow diagram showing a process for clearing entries from a blacklist.

Reference is made to FIG. 5. FIG. 5 shows the clearing of the entries in the blacklist of FIG. 4. The process of FIG. 5 starts at block 500 and proceeds to block 520 in which a check is made to determine whether data is expired in the blacklist. Such data is an identifier for a network or a ColorCode for an EVDO network.

If data has expired in the blacklist, the process proceeds from block 520 to block 522 in which the expired data is cleared. As indicated above, the non-expired data is retained in the blacklist.

From block 522, the process proceeds back to block 520 to continue to check for expired data in the blacklist.

From block 520 if data has not expired in the blacklist, the process proceeds to block 530 in which a check is made to determine whether the radio has been turned off. If yes, then the process proceeds to block 532 in which all data in the blacklist is cleared. From block 532 the process proceeds back to block 520 to continue to check whether data has expired in the blacklist.

In block 530 if the radio has not been turned off the process proceeds back to block 520 to continue to check for expiration of data in the blacklist.

FIGS. 2, 3, 4 and 5 provide for the establishment of a data session on a second network if the first network is either on a blacklist or if authentication fails, which results in the network being placed on the blacklist. For example, if an EVDO network is on the blacklist or if AN authentication fails, a data session is established on the related CDMA 1× network. The establishment of the data session on the related CDMA 1× network rather than repeated attempts to establish an EVDO data session allows for the data establishment to occur more quickly, thereby enhancing user experience and saving battery and over the air resources.

Figure 6:
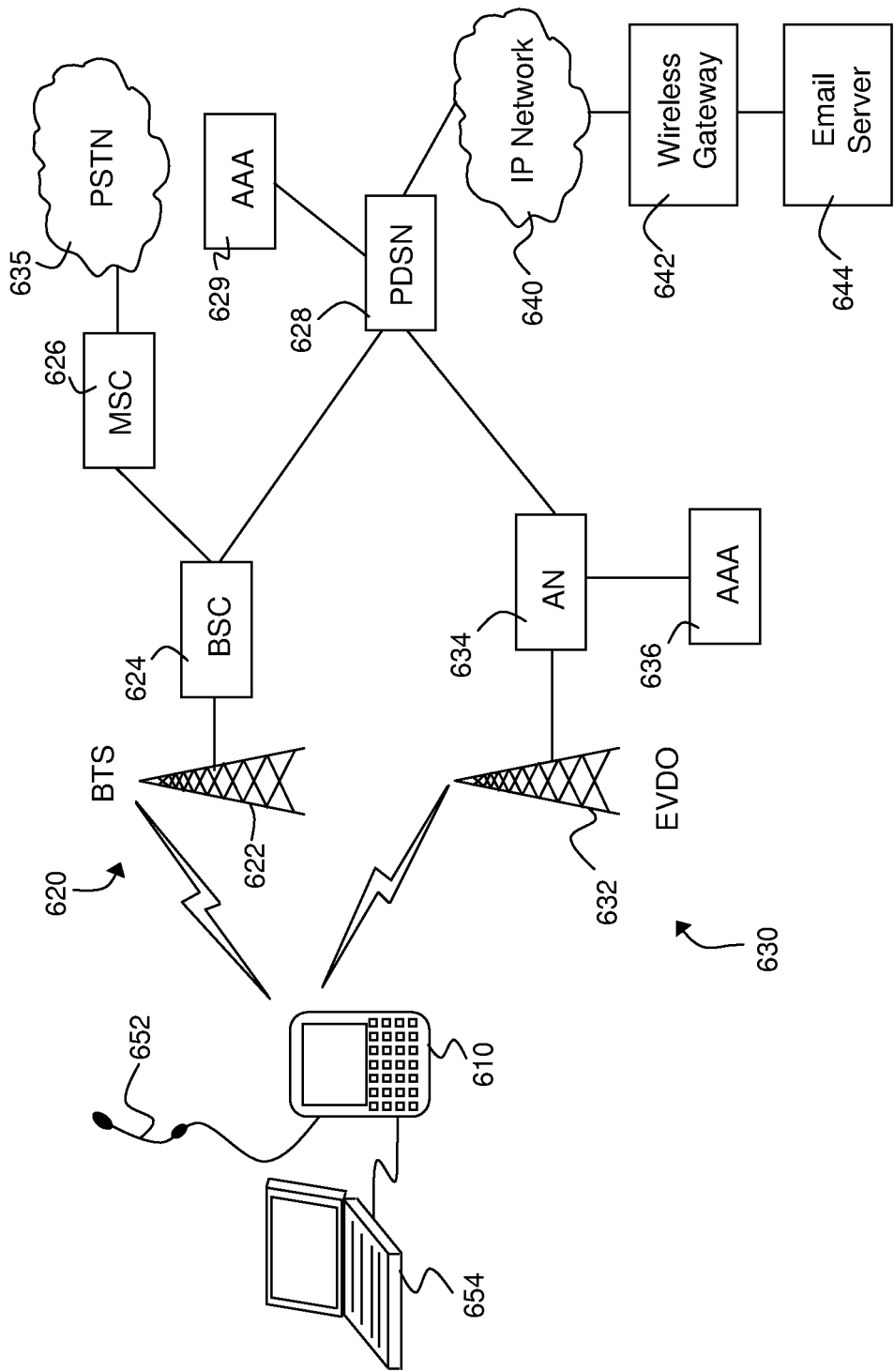
FIG. 6 is a block diagram showing exemplary hybrid CDMA 1×/EVDO network.

Reference is now made to FIG. 6. FIG. 6 is a block diagram of an exemplary wireless data network in accordance with the present disclosure and with which the various embodiments of the methods of the present disclosure may cooperate. FIG. 6 shows a block diagram of a wireless data device 610 and exemplary CDMA 1× network 620, an exemplary EVDO network 630, a public switched telephone network (PSTN) 635, an IP network 640, wireless gateway 642 and e-mail server 644. The wireless data device 610 is generally a two-way communication device having data and voice communication capabilities.

CDMA network 620 includes a base transceiver station (BTS) 622 and a base station controller (BSC) 624. Base station controller 624 communicates with a mobile switching centre 626 which as will be appreciated, is a circuit switched only component communicating with PSTN 635. Base station controller 624 further communicates with a packet data serving node (PDSN) 628 which is a packet switched only component. PDSN 628 further communicates with IP network 640.

EVDO network 630 contains an EVDO sector 632, which communicates with access node (AN) 634. Since the EVDO network 630 is a data only network, access node 634 communicates only with PDSN 628 and not with any circuit switched components.

An authentication, authorization and accounting node 636 is associated with AN 634, and a similar node 629 is associated with PDSN 628. Other ANs may (not shown) be communicated with through PDSN 628 and IP network 640. Such other ANs will have associated AAA nodes.

Operationally, hybrid access terminal (mobile device) 610 communicates wirelessly with CDMA network 620 using BTS 622 and BSC 624 to gain access to the services provided by the CDMA 1× network. Depending on the 1× and EVDO channel scanning sequences determined by the mobile device and the available 1× and EVDO networks over the air, in some cases CDMA 1× network is acquired first and the establishment of the CDMA network connection occurs prior to any EVDO network connection being established.

Mobile device 610 sends and receives both data and voice services through CDMA network 620 until an EVDO network connection is established. Base station controller 624 communicates with circuit switch services provided by MSC 626 such as voice and short message service (SMS) via PSTN 635.

Prior to an EVDO connection being established, hybrid access terminal 610 further communicates wirelessly with BTS 622 and BSC 624 to gain access to packet data services provided by PDSN 628, such as e-mail, wireless application protocol (WAP) and other data services via IP network 640. Such services are provided through wireless gateway 642 and servers such as e-mail server 644.

Once a network connection is established with CDMA 1× network 620 and the hybrid access terminal enters CDMA 1× idle state, wireless device 610 may attempt to establish a connection with EVDO network 630. This is done through EVDO sector 632 and AN 634. An authentication protocol as described above with regards to FIG. 1 may be performed.

In this way, mobile device 610 may gain access to packet data services provided by PDSN 628 using EVDO network 630. Subsequent to the establishment of an EVDO network connection with mobile device 610, CDMA network 620 is used to provide circuit switched services such as voice and SMS while EVDO network 630 is used to provide packet data services such as e-mail and WAP.

For the case when mobile device 610 acquires EVDO first, it may gain access to packet data services provided by PDSN 628 using EVDO network 630. Once the hybrid access terminal enters EVDO idle state, the mobile device 610 may attempt to establish a connection with CDMA 1× network 620 for circuit switch services provided by MSC 626 such as voice and short message service (SMS) via PSTN 635.

As will be appreciated by those skilled in the art, mobile device 610 can include voice communication means such as a headpiece 652 or a user can communicate directly into the mobile device 610.

Mobile device 610 can also, in some cases, be used as a wireless modem and be connected through various means such as a USB or other serial port, or by short range wireless communications with a computer 654. Computer 654 can then gain access to IP network 640 through EVDO network 630 using hybrid access terminal 610 as the modem.

As will be appreciated, the above can be implemented on any mobile device. One exemplary mobile device is described below with reference to FIG. 7. This is not meant to be limiting, but is provided for illustrative purposes.

Figure 7:
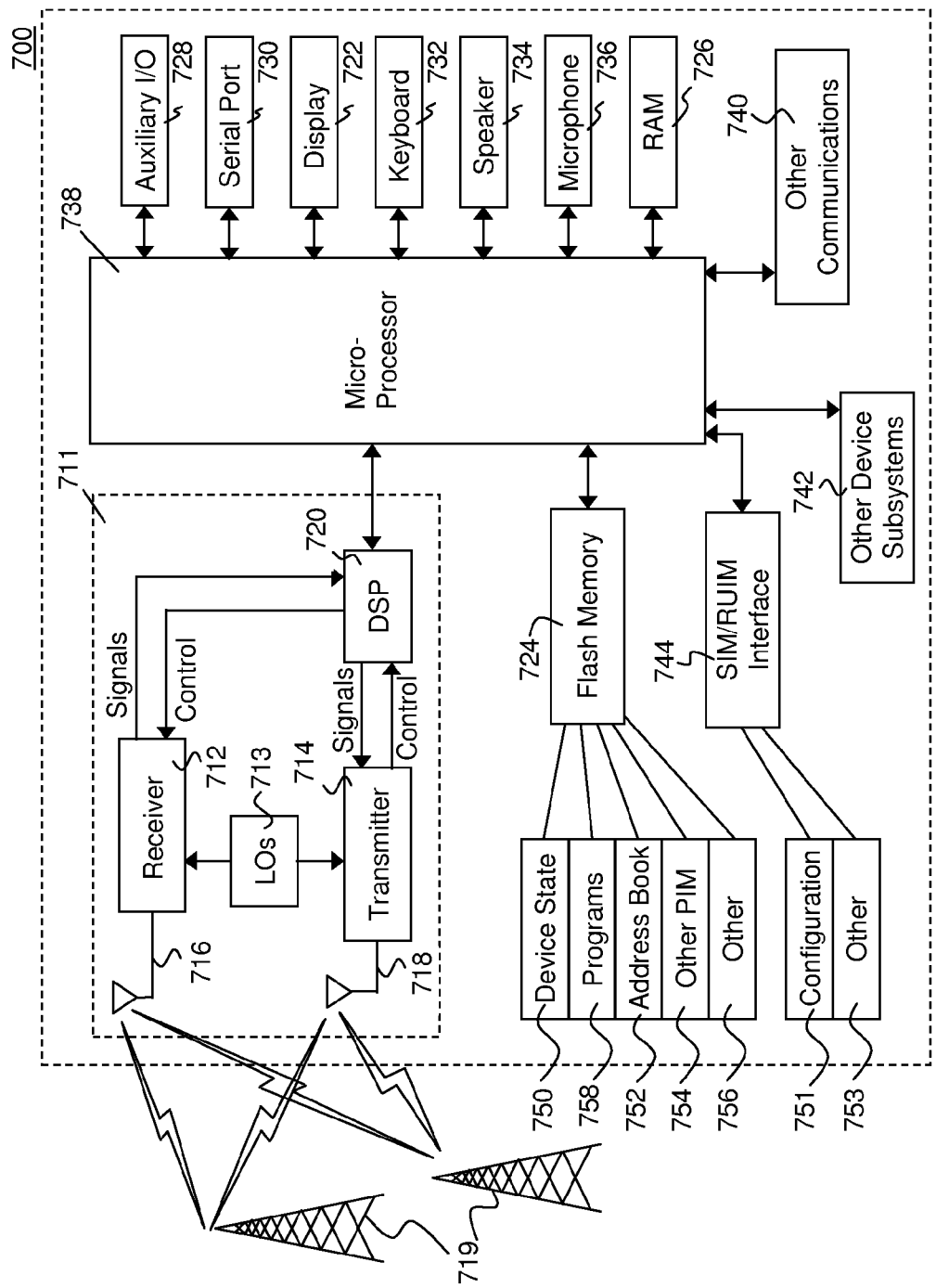
FIG. 7 is a block diagram of an exemplary mobile device.

FIG. 7 is a block diagram illustrating a mobile device capable of being used with the embodiments of the apparatus and methods of the present disclosure. Mobile device 700 is typically a two-way wireless communication device having voice communication capabilities. Depending on the exact functionality provided, the mobile device may be referred to as a data messaging device, a two-way pager, a wireless e-mail device, a cellular telephone with data messaging capabilities, a wireless Internet appliance, a data communication device, a hybrid access terminal, or a wireless device, as examples.

Where mobile device 700 is enabled for two-way communication, it will incorporate a communication subsystem 711, including both a receiver 712 and a transmitter 714, as well as associated components such as one or more, embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate.

Network access requirements will also vary depending upon the type of network 719. A mobile device may require a subscriber identity module (SIM) card or a removable user identity module (RUIM) in order to operate on the network. The SIM/RUIM interface 744 is generally similar to a card-slot into which a SIM/RUIM card can be inserted and ejected like a diskette or PCMCIA card. The SIM/RUIM card may hold key configuration 751, and other information 753 such as identification, and subscriber related information.

When required network registration or activation procedures have been completed, mobile device 700 may send and receive communication signals over the network 719. As illustrated in FIG. 7, network 719 can consist of multiple base stations communicating with the mobile device. For example, in a hybrid CDMA 1x/EVDO coverage, a CDMA base station and an EVDO base station communicate with the mobile device and the mobile device may be connected to both simultaneously. The EVDO and CDMA 1x base stations may use different paging slots to communicate with the mobile device.

Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 is generally stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the mobile device. A predetermined set of applications that control basic operations, including data and voice communication applications for example, may typically be installed on mobile device 700 during manufacturing. Other applications could be installed subsequently or dynamically.

One software application may be a personal information manager (PIM) application having the ability to organize and manage data items relating to the user of the mobile device such as, but not limited to, e-mail, calendar events, voice mails, appointments, and task items. Naturally, one or more memory stores could be available on the mobile device to facilitate storage of PIM data items. Such PIM application would generally have the ability to send and receive data items, via the wireless network 719. In one embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download may be processed by the communication subsystem 711 and input to the processor 738, which may further process the received signal for element attributes for output to the display 722, or alternatively to an auxiliary I/O device 728.

A user of mobile device 700 may also compose data items such as email messages for example, using the keyboard 732, which is, in one embodiment, a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile device 700 is similar, except that received signals could be output to a speaker 734 and signals for transmission could be generated by a microphone 736. Alternative voice or audio I/O subsystems, such as a voice message recording subsystem, may also be implemented on mobile device 700. Although voice or audio signal output is accomplished generally through the speaker 734, display 722 may also be used to provide an indication of the identity of a calling party, the duration of a voice call, or other voice call related information for example.

Serial port 730 in FIG. 7 could be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may also be used for WiFi or WiMAX communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for data session establishment from a mobile device comprising:
    checking whether an identifier for a first network is on a blacklist on the mobile device; if the first network identifier is not on the blacklist, attempting to establish a data connection with the first network;
    if the attempt to establish the data connection is unsuccessful, adding the first network identifier to the blacklist, wherein the adding further comprises adding identifiers of associated networks of a same Radio Access Technology as the first network to the blacklist, and wherein the associated networks are associated with the first network based on a message received at the mobile device; and
    if the first network identifier is on the blacklist, establishing a data connection with a second network,
        wherein the first network and second network use different authentication entities,
        wherein the first network and second network are associated by at least one of a broadcast message, a provisioning message, a public land mobile network, a preferred roaming list and an extended preferred roaming list.

2. The method of claim 1, wherein the first network is a higher data throughput Radio Access Technology than the second network.

3. The method of claim 1, wherein the first network has a smaller footprint than the second network.

4. The method of claim 1, wherein the first network is an Evolution Data Only (EVDO) network and the second network is a Code Division Multiple Access (CDMA) 1× network.

5. The method of claim 4, wherein the adding comprises adding the EVDO network identifier to the blacklist if the attempt to establish a data connection is unsuccessful.

6. The method of claim 5, wherein a data connection is established with the CDMA network subsequent to the addition of the EVDO network identifier to the blacklist.

7. The method of claim 5, wherein the attempting to establish performs an access network (AN) authentication and wherein the attempting to establish is unsuccessful if the AN authentication returns a rejection.

8. The method of claim 5, wherein the adding the EVDO network identifier further comprises adding EVDO network identifiers for EVDO networks associated with the first network to the blacklist.

9. The method of claim 1, wherein the first network identifier is at least one of an EVDO ColorCode, an EVDO subnet identifier, an EVDO bandclass, an EVDO channel number, a Location Area Identifier, an Absolute Radio Frequency Channel Number (ARFCN), a frequency band, a Base Station Identity Code (BSIC), a Public Land Mobile Network Identifier (PLMN ID), an UTRA Absolute Radio Frequency Channel Number (UARFCN), an Evolved Absolute Radio Frequency Channel Number (EARFCN), a system identifier (SID), a network identifier (NID) and a packet zone identifier (PZID).

10. The method of claim 1, wherein the blacklist further contains a time value associated with the first network identifier, said time value being utilized for the expiration of the first network identifier on the blacklist.

11. The method of claim 1, further comprising checking whether a radio of the mobile device has been turned off, and if the radio has been turned off clearing the blacklist of all entries.

12. A mobile device configured for data session establishment with a network comprising:

a communications subsystem; and
a processor,
wherein the mobile device is configured to:
check whether an identifier for an first network is on a blacklist on the mobile device; if the first network identifier is not on the blacklist, attempt to establish a data connection with the first network;
add a network identifier for the first network to the blacklist if the attempt to establish a data connection is unsuccessful, wherein the adding further comprises adding identifiers of associated networks of a same Radio Access Technology to the first network to the blacklist, and wherein the associated networks are associated with the first network based on a message received at the mobile device; and
if the network identifier is on the blacklist, establish a data connection with a second network,
  wherein the first network and second network use different authentication entities,
  wherein the first network and second network are associated through at least one of a broadcast message, a provisioning message, a public land mobile network, a preferred roaming list and an extended preferred roaming list.

13. The mobile device of claim 12, wherein the first network is a higher data throughput Radio Access Technology than the second network.

14. The mobile device of claim 12, wherein the first network has a smaller footprint than the second network.

15. The mobile device of claim 12, wherein the first network is an Evolution Data Only (EVDO) network and the second network is a Code Division Multiple Access (CDMA) 1× network.

16. The mobile device of claim 15, wherein the mobile device is configured to add the network identifier of the first network by adding the EVDO network identifier to the blacklist if the attempt to establish a data connection is unsuccessful.

17. The mobile device of claim 16, wherein a data connection is established with the CDMA network subsequent to the addition of the EVDO network identifier to the blacklist.

18. The mobile device of claim 16, wherein the adding the EVDO network identifier includes adding EVDO network identifiers for EVDO networks associated with the first network to the blacklist.

19. The mobile device of claim 12, wherein the first network identifier is at least one of an EVDO ColorCode, an EVDO subnet identifier, an EVDO bandclass, an EVDO channel number, a Location Area Identifier, an Absolute Radio Frequency Channel Number (ARFCN), a frequency band, a Base Station Identity Code (BSIC), a Public Land Mobile Network Identifier (PLMN ID), an UTRA Absolute Radio Frequency Channel Number (UARFCN), an Evolved Absolute Radio Frequency Channel Number (EARFCN), a system identifier (SID), a network identifier (NID) and a packet zone identifier (PZID).

20. The mobile device of claim 12, wherein the blacklist further contains a time value associated with the first network identifier, said time value being utilized for the expiration of the first network identifier on the blacklist.

21. The mobile device of claim 12, further configured to check whether a radio has been turned off, and if the radio has been turned off to clear the blacklist of all entries.

* * * * *